US009129077B2

(12) United States Patent
Raschke

(10) Patent No.: US 9,129,077 B2
(45) Date of Patent: Sep. 8, 2015

(54) SYSTEM AND METHOD FOR PREDICTING HUMAN POSTURE USING A RULES-BASED SEQUENTIAL APPROACH

(75) Inventor: Ulrich Raschke, Ann Arbor, MI (US)

(73) Assignee: Siemens Product Lifecycle Management Software Inc., Plano, TX (US)

(*) Notice: Subject to any disclaimer, the term of this patent is extended or adjusted under 35 U.S.C. 154(b) by 2079 days.

(21) Appl. No.: 10/933,699

(22) Filed: Sep. 3, 2004

(65) Prior Publication Data
US 2006/0053108 A1 Mar. 9, 2006

(51) Int. Cl.
G06F 17/50 (2006.01)

(52) U.S. Cl.
CPC ........ G06F 17/5009 (2013.01); G06F 2217/06 (2013.01)

(58) Field of Classification Search
CPC .................................. G06F 17/5004
USPC ....................................... 345/473
See application file for complete search history.

(56) References Cited

U.S. PATENT DOCUMENTS

| | | | |
|---|---|---|---|
| 5,253,189 A | 10/1993 | Kramer | 364/578 |
| 5,623,428 A * | 4/1997 | Kunii et al. | 703/6 |
| 5,625,577 A | 4/1997 | Kunii et al. | 364/578 |
| 5,835,693 A | 11/1998 | Lynch et al. | 395/173 |
| 5,867,631 A | 2/1999 | Sato et al. | 395/97 |
| 5,905,658 A | 5/1999 | Baba | 364/578 |
| 5,982,389 A | 11/1999 | Guenter et al. | 345/474 |
| 5,989,157 A | 11/1999 | Walton | 482/4 |
| 6,005,548 A | 12/1999 | Latypov et al. | 345/156 |
| 6,057,859 A * | 5/2000 | Handelman et al. | 345/474 |
| 6,088,042 A * | 7/2000 | Handelman et al. | 345/473 |
| 6,161,080 A * | 12/2000 | Aouni-Ateshian et al. | 703/11 |
| 6,243,106 B1 | 6/2001 | Rehg et al. | 345/473 |
| 6,404,435 B1 * | 6/2002 | Miller et al. | 345/468 |
| 6,462,742 B1 * | 10/2002 | Rose et al. | 345/473 |
| 6,651,044 B1 | 11/2003 | Stoneman | 706/10 |
| 6,690,999 B2 | 2/2004 | Kimura | 700/245 |
| 6,694,044 B1 | 2/2004 | Pavlovic et al. | 382/107 |
| 6,738,065 B1 * | 5/2004 | Even-Zohar | 345/473 |
| 2003/0018412 A1 | 1/2003 | Kimura | 700/245 |
| 2003/0083596 A1 | 5/2003 | Kramer et al. | 600/595 |
| 2003/0215130 A1 | 11/2003 | Nakamura et al. | 382/154 |
| 2004/0012593 A1 | 1/2004 | Lanciault | 345/473 |

(Continued)

OTHER PUBLICATIONS

Approximating Human Reaching Volumes Using Inverse Kinematics; I. Rodrigueza, M. Peinadoa, R. Boulicb, D. Meziata; Date from applicant cited IDS Dec. 13, 2003 (Source of paper: Citeceer); Total pp. 6—This had only 3 pages on applicant's IDS Jun. 30, 2006.*

(Continued)

Primary Examiner — Akash Saxena

(57) ABSTRACT

According to one embodiment of the invention, a computerized method for predicting posture of a living object includes storing a plurality of posturing rules for a respective activity in a storage location, receiving a start posture of a first living object for the activity, receiving a location of a target for the activity, dividing the activity into a plurality of movements based on the start posture and the location of the target, and determining an end posture of the first living object for the activity. Determining the end posture includes applying at least one of the posturing rules for each of the movements and checking at least one of a plurality of constraints associated with each of the movements.

16 Claims, 3 Drawing Sheets

(56) References Cited

U.S. PATENT DOCUMENTS

| | | | |
|---|---|---|---|
| 2004/0054510 A1 | 3/2004 | Raschke | 703/6 |
| 2004/0119717 A1* | 6/2004 | Furumoto et al. | 345/473 |
| 2005/0062738 A1* | 3/2005 | Handley et al. | 345/419 |
| 2005/0107916 A1 | 5/2005 | Nagasaka | 700/245 |
| 2005/0278157 A1* | 12/2005 | Raschke | 703/6 |
| 2007/0182740 A1* | 8/2007 | Konami et al. | 345/440 |

OTHER PUBLICATIONS

Toward Memory-Based Human Motion Simulation: Development and Validation of a Motion Modification Algorithm; Woojin Park, Don B. Chaffin, and Bernard J. Martin; IEEE Transactions on Systems, Man, and Cybernetics—Part A: Systems and Humans, vol. 34, No. 3, May 2004; Total pp. 11—This had only 6 pages on applicant's IDS Jun. 30, 2006.*

Bringing the Human Arm Reachable Space to a Virtual Environment for its Analysis; I. Rodrigueza, M. Peinadoa, R. Boulicb, D. Meziata; ICME 2003 IEEE; Total pp. 4.*

K. Grochow et al "Style Based Inverse Kinematics" ACM 2004, pp. 522-531.*

"Approximating Human Reaching Volumes Using Inverse Kinematics"; I. Rodriguez, et al; Date from applicant cited IDS Dec. 13, 2003 (Source of paper: Citeceer); Total pp. 6.*

J. Zhao, et al "Inverse Kinematics Positioning Using Nonlinear Programming for Highly Articulated Figures", ACM Transactions on Graphics, vol. 13 No. 4, Oct. 1994 (24 pgs).*

Ulrich Raschke, et al. "*Control Strategies for Simulating Human Movement,*" Digital Human Modeling for Design and Engineering Conference and Exposition, Dayton, Ohio, Apr. 28-29, 1998; (7 pages total).

U.S. Appl. No. 10/246,880, filed Sep. 18, 2002 entitled: System and Method for Simulating Human Movement; Inventor is Ulrich Raschke.

U.S. Appl. No. 10/869,462, filed Jun. 15, 2004 entitled: System and Method for Simulating Human Movement Using Profile Paths; Inventor is Ulrich Rashke.

L.M. Tanco and A.Hilton, "Realistic Synthesis of Novel Human Movements from a Database of Motion Capture Examples," *Proceedings Workshop on Human Motion IEEE Comput. Soc,* Los Alamitos, CA, XP002309200, ISBN 0-7695-0939-8, pp. 137-42, Dec. 8, 2000.

PCT Notification of Transmittal of the International Search Report and the Written Opinion of the International Searching Authority, or the Declaration, for International Application No. PCT/US2005/031415, 28 pages, Jun. 1, 2006.

Rodriguez et al.; Reaching Volumes Generated by Means of Octal Trees and Cartesian Constraints; XP-10646248; 6 pages, Jul. 9, 2003.

D. J. Wiley, et al., Interpolation Synthesis of Articulated Figure Motion, *IEEE Computer Graphics and Applications,* © 1997 (7 pgs).

S. L. Delp, et al., A Computational Framework for Simulating and Analyzing Human and Animal Movement, Sep./Oct. 2000, Computing in Medicine, *Computer in Science & Engineering* (5 pgs).

X. Li, et al., Model Predictive Control of Human Elbow Joint Movement, Proceedings of the 20th Annual Intl. Conf. of the IEEE Engineering in Medicine and Biology Society, vol. 20, No. 5, 1998, © 1998 IEEE (4 pgs).

J. Zhao, et al., Inverse Kinematics Positioning Using Nonlinear Programming for Highly Articulated Figures, *ACM Transactions on Graphics,* vol. 13, No. 4, Oct. 1994 (24 pgs).

H. Miyamoto, et al., A Kendama Learning Robot Based on Bi-directional Theory, 1996 Special Issue, Neural Networks, vol. 9, No. 8, pp. 1281-1302, © 1996 *Elsevier Science Ltd.* (22 pgs).

H-S Chung, et al., *MCML: motion capture markup language for integration of heterogeneous motion capture data,* Computer Standards & Interfaces 26 (2004) 113-130, www.ElsevierComputerScience.com, © 2003 (18 pgs).

J. Lander, Working with Motion Capture File Formats, *Game Developer Magazine,* Jan. 1998, www.gdmg.com (8 pgs).

T. B. Moeslund, et al., *Multiple Cues used in Model-Based Human Motion Capture,* Laboratory of Computer Vision and Media Technology, Institute of Electronic Systems, Denmark (6 pgs).

*New UNICA Service Uniquely Customizes 1.5 Terabytes of Motion Capture Data,* downloaded from http://www.hoise.com/primeur/99/articles/monthly/AE-PR-09-99-40.html, Apr. 7, 2006 (2 pgs).

K.A. Smith, et al., Endpoint Position Control Using Biological Concepts, Department of Mechanical and Aerospace Engineering, © 1993 *IEEE.* (6 pgs).

V. B. Zordan, et al., Motion Capture-Driven Simulations that Hit and React, © 2002, *Association for Computing Machinery, Inc.* (9 pgs).

PCT Notification of Transmittal of the International Search Report and the Written Opinion of the Interantional Searching Authority, or the Declaration, mailed Oct. 26, 2005, corresponding to PCT/US05/022499 filed Jun. 15, 2005 (14 pages).

Office Action mailed Oct. 26, 2005, U.S. Appl. No. 10/246,880, filed Sep. 18, 2002, Ulrich Raschke.

Office Action mailed Apr. 20, 2006, U.S. Appl. No. 10/246,880, filed Sep. 18, 2002, Ulrich Raschke.

Office Action mailed Oct. 2, 2006, U.S. Appl. No. 10/246,880, filed Sep. 18, 2002, Ulrich Raschke.

Office Action mailed Feb. 9, 2007, U.S. Appl. No. 10/246,880, filed Sep. 18, 2002, Ulrich Raschke.

Office Action mailed Jul. 16, 2007, U.S. Appl. No. 10/246,880 filed Sep. 18, 2002, Ulrich Raschke.

Office Action mailed Jan. 2, 2008, U.S. Appl. No. 10/246,880, filed Sep. 18, 2002, Ulrich Raschke.

Office Action mailed Jun. 30, 2008, U.S. Appl. No. 10/246,880, filed Sep. 18, 2002, Ulrich Raschke.

Advisory Action mailed Oct. 23, 2008, U.S. Appl. No. 10/246,880, filed Sep. 18, 2002, Ulrich Raschke.

Office Action mailed Nov. 17, 2005, U.S. Appl. No. 10/869,462, filed Jun. 15, 2004, Ulrich Raschke.

Office Action mailed Apr. 20, 2006, U.S. Appl. No. 10/869,462, filed Jun. 15, 2004, Ulrich Raschke.

Advisory Action mailed Jul. 13, 2006, U.S. Appl. No. 10/869,462, filed Jun. 15, 2004, Ulrich Raschke.

Office Action mailed Nov. 28, 2006, U.S. Appl. No. 10/869,462, filed Jun. 15, 2004, Ulrich Raschke.

Office Action mailed Jun. 27, 2007, U.S. Appl. No. 10/869,462, filed Jun. 15, 2004, Ulrich Raschke.

Advisory Action mailed Sep. 14, 2007, U.S. Appl. No. 10/869,462, filed Jun. 15, 2004, Ulrich Raschke.

Anpo, Hideo; Nikkei Computer Graphics, "Visual Engineering Tool: Virtual Human [2]"; vol. 161, Feb. 8, 2000, pp. 156-161; Others; 2000.

Anpo, Hideo; Nikkei Computer Graphics, "What Comes after Three-Dimensional CAD: Virtual Human [1]"; vol. 160, Jan. 8, 2000, pp. 144-147; Others; 2000.

English Translation of Japanese Office Action dated Jul. 25, 2012 in connection with Japanese Application No. 2007-530417.

* cited by examiner

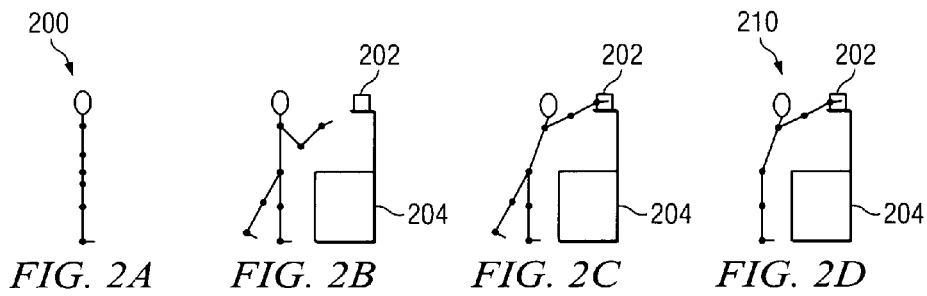
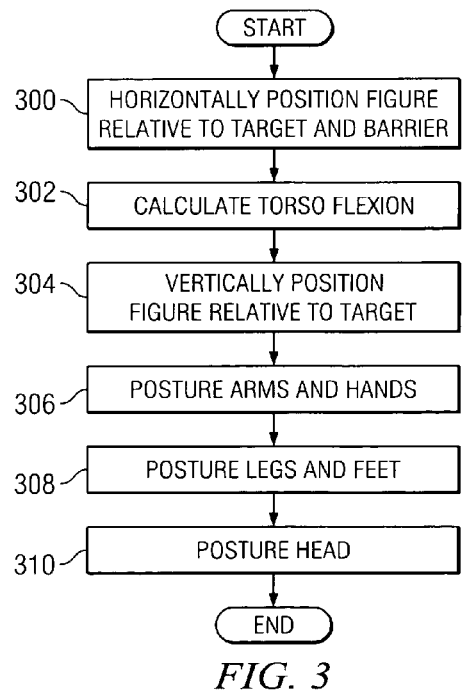
FIG. 3

SYSTEM AND METHOD FOR PREDICTING HUMAN POSTURE USING A RULES-BASED SEQUENTIAL APPROACH

TECHNICAL FIELD OF THE INVENTION

The present invention relates generally to the computer-aided design ("CAD") industry and, more particularly, to a system and method for predicting human posture using a rules-based sequential approach.

BACKGROUND OF THE INVENTION

Human movement simulation tools are used for ergonomic analysis of workplaces, products, training and service operations, as well as in the entertainment industry. The process of accurately representing human movement is tedious, time-consuming, and requires skilled operators adept at manipulating complex 3D kinematic systems at the joint level and an eye for postural realism. Prior efforts at predicting human postures has not provided the desired simultaneous characteristics of being computationally rapid, physiologically realistic, and generalizable to novel conditions. These characteristics are important requirements to allow human simulation tools to be deployed outside the domain of human factors specialists. The tools used to evaluate the human performance capability are sensitive to posture information, so accurate and representative posturing is important to obtaining valuable design guidance from these tools.

Contemporary prediction tools attempt to model the whole body posture based on underlying optimization objectives or empirical models applied to the whole body. Some current reach and lift posturing applications involve the use of inverse kinematics (IK) to solve for the posture of legs, torso and arms. Hand glyphs are placed in the scene to define where the figure is to reach to, and an IK solver is used to posture the figure such that the hands reach these desired locations. While the IK solution is very general and quick, it often results in non-desirable postures.

SUMMARY OF THE INVENTION

According to one embodiment of the invention, a computerized method for predicting posture of a living object includes storing a plurality of posturing rules for a respective activity in a storage location, receiving a start posture of a first living object for the activity, receiving a location of a target for the activity, dividing the activity into a plurality of movements based on the start posture and the location of the target, and determining an end posture of the first living object for the activity. Determining the end posture includes applying at least one of the posturing rules for each of the movements and checking at least one of a plurality of constraints associated with each of the movements.

Embodiments of the invention provide a number of technical advantages. Embodiments of the invention may include all, some, or none of these advantages. In one embodiment, a posture prediction method utilizes an analytical arm and leg posturing method that takes as input the location of the target end effector, and sets the elbow/knee location based on the input "splay" value. This approach may allow deterministic posturing of the arms and legs, thereby avoiding "chicken arms" or mis-postured knees. One approach uses a cascading method that sequentially postures specific aspects of the figure and performs tests at the end of each step to determine the parameters for the following operation. This rules-based approach may allow the user to specify the location of an object to lean against. If an object is provided, it is taken into account in the cascade approach. The approach may also provide a step toward the object, which provides for a more realistic looking posture as it attempts to model the step people take to increase their mechanical advantage relative to the object by moving closer to it. The balance of the figure may also be accounted for in the cascade approach, as well as one- and two-handed operations. Contrary to previous posture prediction attempts, this new approach simultaneously incorporates target reachability requirements, human physiological joint range of motion limits and/or segment length consistency requirements, balance requirements, force exertion requirements, and other such environmental and figure conditions that will influence the posture.

In addition, any reasonable kinematic skeletal configuration may be simulated, such as a human or other living object. Automated prediction of realistic postures affords the deployment of human simulation technology to engineers without human factors backgrounds, enabling them to effectively screen their designs for human factors issues without direct involvement of human factors specialists.

Other technical advantages are readily apparent to one skilled in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which:

FIGS. 2A through 2D illustrate a posture prediction of an activity divided into a plurality of movements according to one embodiment of the present invention;

FIG. 3 is a flowchart illustrating a computerized method of predicting human posture according to one embodiment of the invention.

DETAILED DESCRIPTION OF EXAMPLE EMBODIMENTS OF THE INVENTION

Example embodiments of the present invention and their advantages are best understood by referring now to FIGS. 1A through 4 of the drawings, in which like numerals refer to like parts.

Figure 1A:
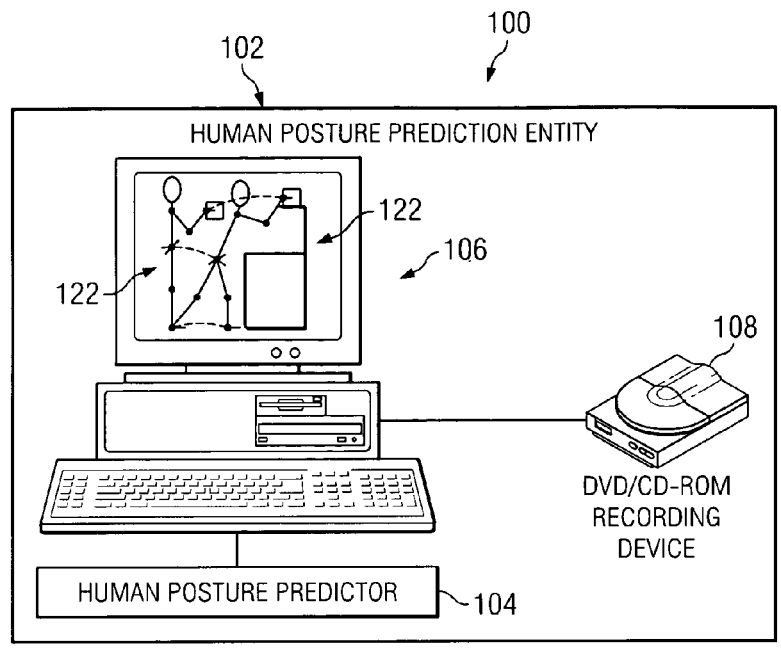
FIG. 1A is a block diagram illustrating a human posture prediction system according to one embodiment of the invention.

FIG. 1A is a block diagram illustrating a human posture prediction system 100 according to one embodiment of the present invention. System 100 includes a human posture prediction entity 102 employing a human posture predictor 104 having access to a computer 106 and a recording device 108. Human posture prediction entity 102 may be any company or other suitable entity that desires to predict human posture, such as with CAD/CAM/CAE software, animated movies, video games, and other suitable software applications. Human posture prediction entity 102 often has a goal of predicting human posture in an accurate and cost-efficient manner. Because human posture prediction may be a relatively complex and costly process, some embodiments of the present invention provide a computerized method and system that uses a rules-based sequential approach to realistically predict human posture. This computerized method may be adapted to any posture in a consistent manner without having to utilize such things as mathematical optimization methods. In addition, although prediction of "human" posture is used throughout this detailed description, any reasonable kinematic skeletal configuration may be predicted, such as that of an animal, fish or other suitable living object. This computerized method is utilized by human posture predictor 104, which may be either an individual employee, a group of employees employed by human posture prediction entity 102, or an independent computer program that initiates the method.

Figure 1B:
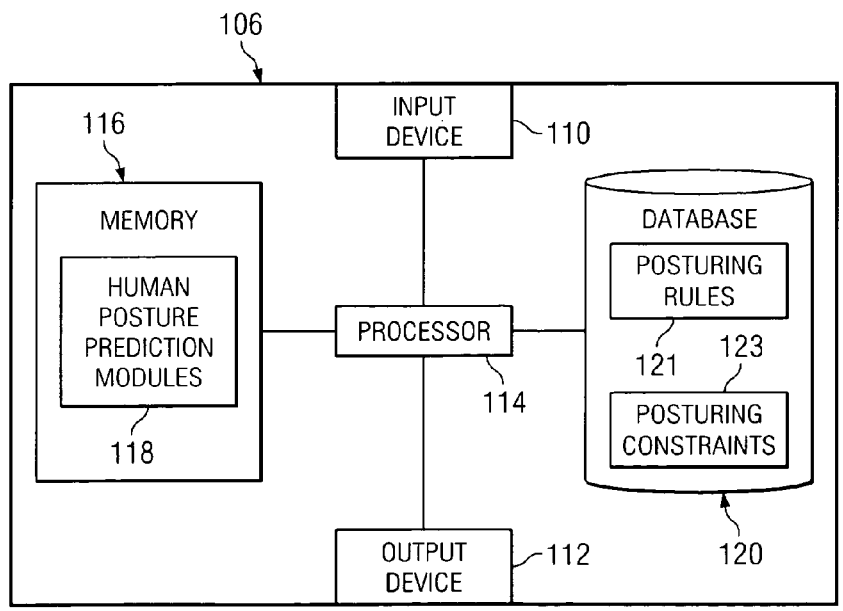
FIG. 1B is a block diagram of a computer in the system of FIG. 1A for use in predicting human posture according to one embodiment of the invention.

FIG. 1B is a block diagram of computer 106 for use in predicting human posture according to one embodiment of the present invention. In the illustrated embodiment, computer 106 includes an input device 110, an output device 112, a processor 114, a memory 116 storing human posture prediction modules 118, and a database 120 storing posturing rules 121 and posturing constraints 123.

Input device 110 is coupled to computer 106 for allowing human posture predictor 104 to utilize human posture prediction modules 118. For example, human posture predictor 104 may utilize human posture prediction modules 118 through one or more user interfaces contained within human posture prediction modules 118. This allows human posture predictor 104 to input, select, and/or manipulate various data and information. In one embodiment, input device 110 is a keyboard; however, input device 110 may take other forms, such as an independent computer program, a mouse, a stylus, a scanner, or any combination thereof.

Output device 112 is any suitable visual display unit, such as a liquid crystal display ("LCD") or cathode ray tube ("CRT") display, that allows human posture predictor 104 to "see" the human posture that he or she is trying to predict. For example, referring back to FIG. 1A, an example prediction 122 may be seen on output device 112. In the illustrated embodiment, a human is stepping forward and grabbing a box on a shelf. Output device 112 may also be coupled to recording device 108 for the purpose of recording any desired information, such as a particular prediction or other suitable information. For example, a posture prediction may be recorded on a DVD, CD-ROM, or other suitable media. A posture prediction may also be sent to a file or utilized by another computer program.

Processor 114 comprises any suitable type of processing unit that executes logic. One of the functions of processor 114 is to retrieve human posture prediction modules 118 from memory 116 and execute human posture prediction modules 118 to allow human posture predictor 104 to predict human posture. Other functions of human posture prediction modules 118 are discussed more fully below in conjunction with FIGS. 2A through 4. Processor 114 may also control the capturing and/or storing of information and other suitable data, such as data indicative of a measured movement of a human.

Human posture prediction modules 118 are computer programs written in any suitable computer language. According to the teachings of one embodiment of the invention, human posture prediction modules 118 are operable to utilize data and information stored in database 120 (such as posturing rules 121 and posturing constraints 123) and input by human movement predictor 104 for the purpose of predicting posture of a human. Human posture prediction modules 118 may perform other suitable functions, such as capturing data indicative of a measured movement of a human. Some functions of human posture prediction modules 118 are described below in conjunction with FIGS. 2A through 4. In the illustrated embodiment, human posture prediction modules 118 are logic encoded in memory 116. However, in alternative embodiments, human posture prediction modules 118 are implemented through application specific integrated circuits ("ASICs"), field programmable gate arrays ("FPGAs"), digital signal processors ("DSPs"), or other suitable specific or general purpose processors.

Memory 116 and database 120 may comprise files, stacks, databases, or other suitable organizations of volatile or non-volatile memory. Memory 116 and database 120 may be random-access memory, read-only memory, CD-ROM, removable memory devices, or any other suitable devices that allow storage and/or retrieval of data. Memory 116 and database 120 are interchangeable and may perform the same functions. In the illustrated embodiment, database 120 stores posturing rules 121, posturing constraints 123, and other suitable information, such as formulas and tables of data that allows human posture prediction modules 118 to perform their function when predicting human posture. Database 120 may also store data associated with the capturing of a measured movement of a human, such as that data captured with the use of motion capture technology.

As described in further detail below in conjunction with FIGS. 2A through 4, posturing rules 121 are utilized to determine an end posture for a skeletal configuration, such as a human figure, for a particular activity. Posturing rules 121 may be determined in any suitable manner and may be simple tests or complex empirical models, such as the concomitant contribution of pelvis rotation with torso flexion. Posturing constraints 123 may be utilized along with posturing rules 121 to help predict the end posture. Any suitable posturing constraint may be utilized, such as a balance for the figure, a location of a barrier, a sight line for the figure, reachability of a target, physiological correctness, a strength of the figure, or other suitable constraints that may be useful in accurately predicting an end posture for the figure. Posturing constraints 123 may or may not be specific to a particular activity.

To illustrate the teachings of one embodiment of the invention, a simple activity for a human is used as an example. Referring to FIGS. 2A through 2D, an activity of a human FIG. 200 grabbing a target 202 on a shelf is utilized to illustrate a prediction of an end posture 210 for FIG. 200 according to one embodiment of the invention. The activity is divided up into a plurality of movements, some of which are illustrated by FIGS. 2A through 2D.

Figure 4:
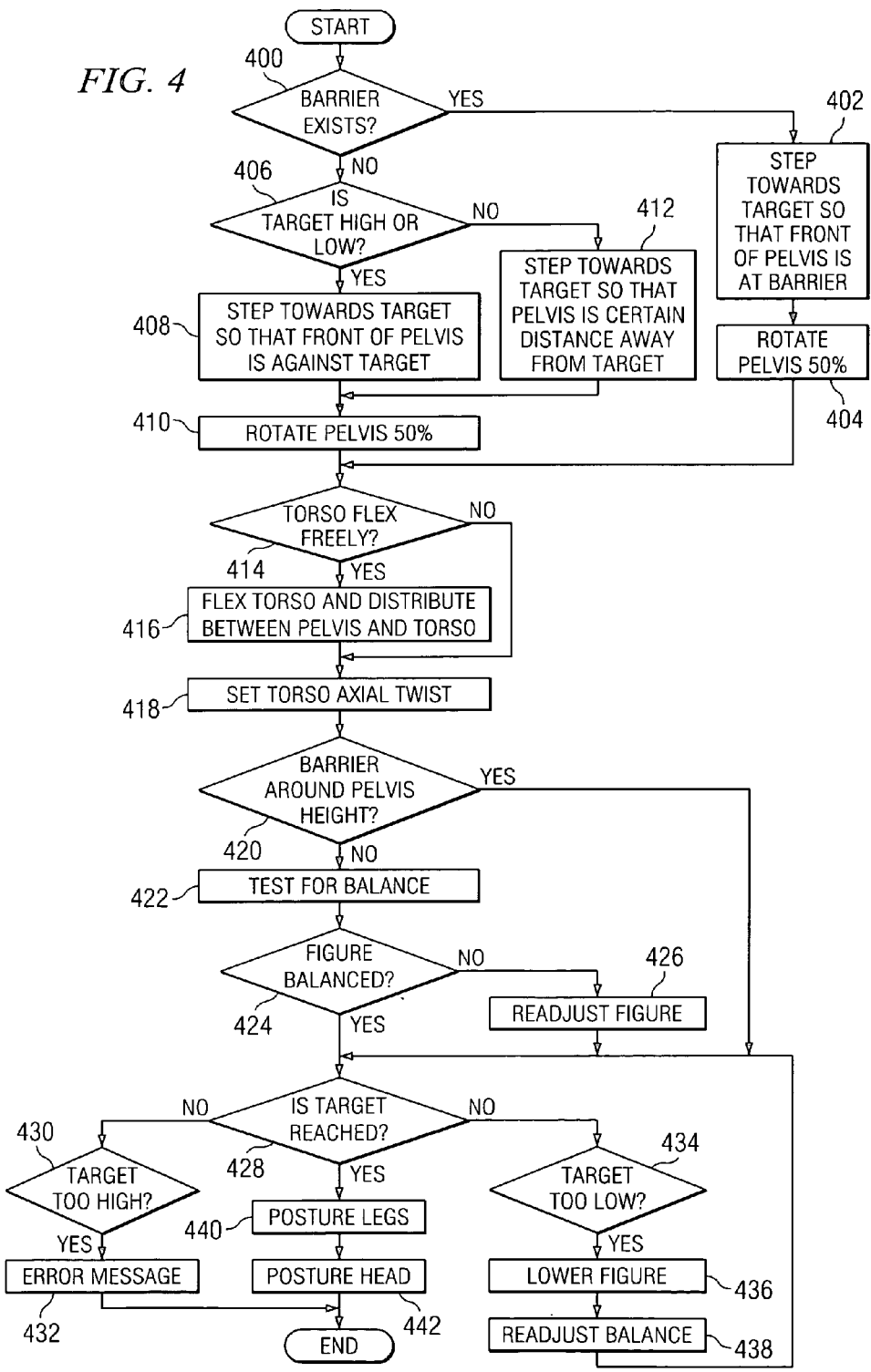
FIG. 4 is a flowchart illustrating an example posture prediction method using the activity of FIGS. 2A through 2D according to one embodiment of the invention.

As illustrated in FIG. 2A, a human skeletal configuration (FIG. 200) is shown standing straight up with the arms hanging straight down along the sides of the body. In FIG. 2B, FIG. 200 is taking one step forward and starting to raise their arms toward target 202, which in the illustrated embodiment is a box on a shelf. Since there is a barrier 204 between FIG. 200 and target 202, the torso of FIG. 200 flexes forward and the arms stretch out in order to reach target 202, as illustrated in FIG. 2C. FIG. 200 then takes on its end posture, as illustrated in FIG. 2D, by moving the back leg forward and posturing the head. As described below in conjunction with FIGS. 3 and 4, a particular set of posturing rules 121 are stored in database 120 and are utilized for the particular activity illustrated in FIGS. 2A through 2D. In addition, there may be particular posturing constraints 123 associated with the movements of the activity in FIGS. 2A through 2D. These posturing rules 121 and posturing constraints 123 are utilized as illustrated in the flowcharts of FIGS. 3 and 4 to illustrate one embodiment of the posture prediction method of the present invention.

FIG. 3 is a flowchart illustrating a computerized method of predicting human posture according to one embodiment of the invention. The human posture predicted in this example method is end posture 210, as illustrated in FIG. 2D. The flowchart in FIG. 3 illustrates the general methodology utilized to predict the end posture, while the flowchart in FIG. 4 is a more detailed methodology of predicting the end posture of the activity in FIGS. 2A through 2D.

Referring now to FIG. 3, FIG. 200 is horizontally positioned relative to target 202 and barrier 204. This is illustrated best in FIG. 2B where FIG. 200 has taken a step forward towards target 202 and next to barrier 204. At step 302, torso flexion is calculated for FIG. 200, as illustrated in FIG. 2C. The calculation of the torso flexion may be by any suitable method. In one embodiment, an application of the law of cosines is utilized.

At step 304, FIG. 200 is vertically positioned relative to target 202. In other words, if target 202 is too high, FIG. 200 may have to raise up on its toes to reach target 202, or if target 202 is too low the knees of FIG. 200 may have to be flexed so that FIG. 200 can stoop to pick up target 202. At step 306, the arms and hands of FIG. 200 are postured to realistically predict the posture of the arms and hands for the particular activity. At step 308, the legs and feet of FIG. 200 are postured to realistically predict the posture of the legs and feet of FIG. 200. And at step 310, the head of FIG. 200 may be postured to realistically predict the posture of the head. This then ends the example method illustrated in FIG. 3.

As described above, the general methodology for predicting an end posture for a particular activity may be different than the general methodology shown in FIG. 3 depending on the type of activity. Posturing rules 121 and posturing constraints 123 may be specific to a particular activity and may be modified or supplemented with further posturing rules or posturing constraints by posture predictor 104 (FIG. 1A) in order to accurately and realistically predict the end posture for a particular figure for a particular activity.

FIG. 4 is a flowchart illustrating an example posture prediction method using the activity of FIGS. 2A through 2D according to one embodiment of the invention. The flowchart illustrated in FIG. 4 is a more specific methodology than that illustrated in FIG. 3 and, hence, more clearly illustrates the prediction of end posture 210 for FIG. 200 for the activity illustrated in FIGS. 2A through 2D. The methodology illustrated in FIG. 4 illustrates some of the functionality of a particular posture prediction module 118 (FIG. 1B) for the particular activity illustrated in FIGS. 2A through 2D, which is a human that is standing up and reaching for a box on a shelf. Hence, it is assumed for the purposes of discussion of the flowchart in FIG. 4 that a plurality of posturing rules 121 and posturing constraints 123 are already stored in database 120 for this activity and the start posture of FIG. 200 is input into computer 106 in addition to the location of target 202 and barrier 204.

The example method begins at decisional step 400 where it is determined whether or not a barrier exists. If a barrier exists, then a step is taken towards the target so that the front of the pelvis is at the barrier, as indicated by step 402. This is one of the posturing rules 121 stored in database 120. The pelvis is rotated fifty percent at step 404, which is another posturing rule 121. Although these posturing rules 121 may be different for different activities, rotating the pelvis fifty percent, as indicated in step 404, is a rule that models the behavior that when one steps to a target with one foot, the pelvis typically does not end up square to the target.

Referring back to decisional step 400, if a barrier does not exist, then it is determined whether or not the target is too high or too low. The question asked at decisional step 406 may be one of the posturing constraints 123. This particular posturing constraint is the reachability of the target. This constraint is checked at this step in order to influence the next movement of the figure. If the target is too high or too low, then a step is taken towards the target so that the front of the pelvis is against the target, as indicated by step 408. Again, this is another one of the posturing rules 121. If the target is not too high or too low, then a step is taken towards a target so that the pelvis is a certain distance away from the target, as indicated by step 412. The rationale for this particular rule is that if a target is vertically toward the center of a person's body, then in reality it is not next to the body when they grab it but a certain distance away. This facilitates the realistic posturing, which is one advantage of the present invention. In either event, the pelvis is rotated fifty percent as indicated at step 410.

The method continues at decisional step 414, where it is determined whether or not the torso can flex freely. If the torso can flex freely, then the torso is flexed and this flexure is distributed between the pelvis and the torso, as indicated by step 416. The amount of pelvic flexion may be calculated using any suitable method, such as from the Anderson regression equation provided that the overall torso flexion and knee angles are known. The regression equation returns the amount of pelvic flexion and the rest is attributed to the torso. For example, the regression equation may be PelvicAngle=−17.5−1.2*T+0.226*K+0.0012*T*K+0.05*T*T−0.00075*K*K, where T is the overall torso flexion, K is the included knee angle, and PelvicAngle is the angle in degrees from neutral. The next step, as indicated at step 418, is to set the torso axial twist. For example, if the pelvis was rotated fifty percent to the target earlier in the method, it may be squared up here with respect to the target.

The method continues at decisional step 420 where it is determined whether or not the barrier is around the pelvis height. If the barrier is not around the pelvis height, then a balance test is performed at step 422. This is another of the posturing constraints 123. The balance for a particular figure may be checked using any suitable method. At decisional step 424 it is determined whether or not the figure is balanced. If the figure is not balanced, then the posture of the figure needs to be readjusted at step 426, which facilitates the realistic posturing of the figure. If the figure is balanced, or after the figure is readjusted, then the method continues at decisional step 428. In addition, referring back to decisional step 420, if the barrier is around the pelvis height then the method continues at decisional step 428.

At decisional step 428, it is determined whether the target has been reached. Again this is one of the posturing constraints 123, in which the reachability of the target is determined. If the target has not been reached, then the target is either too high or too low. If the target is too high, as indicated at step 430, then an error message is generated at step 432 and indicates to human posture predictor 104 (FIG. 1A) that the object can not be reached. An additional step here, which is not illustrated, may be to check to see if raising the figure up on its toes would facilitate the reaching of the target.

If the target is too low, as indicated by step 434, then the figure needs to be lowered, as indicated by step 436. This may require the flexing of the knees of the figure, or further bending of the torso of the figure. In any event, the balance of the figure is checked at step 438 and readjusted if necessary. Once the reachability test is affirmative, then the method continues at step 440 where the legs are postured. This is similar to step 308 in FIG. 3 where the realistic posturing of the legs and feet are performed. At step 442, the head of the figure is postured to realistically posture the head of the figure. This then ends the example method illustrated in FIG. 4.

Thus, as illustrated in FIG. 4, a plurality of posturing rules 121 for a particular activity are applied for a plurality of movements for the activity while a plurality of constraints 123 are checked with some of the movements for the activity to determine an end posture for the figure for the activity. Although only an end posture was determined for a particular activity using particular posturing rules and posturing constraints, other posturing rules and posturing constraints may be utilized within the teachings of the present invention. For example, the strength of the figure, the forces encountered by the figure during particular movements of the activity, or whether or not the figures can see the target all may be taken into account, in addition to other suitable constraints. An advantage of the present invention is that the methodology is scalable to a myriad of different activities to accurately and realistically predict an end posture for a figure.

Although embodiments of the invention and their advantages are described in detail, a person skilled in the art could make various alterations, additions, and omissions without departing from the spirit and scope of the present invention as defined by the appended claims.

What is claimed is:

1. A computerized method for predicting posture of a physical object, comprising:
   storing a plurality of posturing rules for a respective activity in a storage location;
   receiving a start posture of a physical object for the activity;
   receiving a location of a target for the activity;
   dividing the activity into a plurality of movements based on the start posture and the location of the target; and
   determining, without using motion capture data, an end posture of the physical object for the activity, comprising:
      positioning the physical object using an action specified by at least one of the posturing rules for each of the movements;
      checking a resulting state of the physical object against at least one of a plurality of constraints associated with each of the movements; and
      adjusting an intermediate posture of the physical object based on a result of the checking step.

2. The computerized method of claim 1, further comprising selecting one of a plurality of modules for the respective activity.

3. The computerized method of claim 1, wherein the plurality of posturing rules comprises:
   horizontally positioning the physical object relative to the target;
   flexing a torso of the physical object;
   rotating a pelvis of the physical object around a vertical axis;
   vertically positioning the pelvis of the physical object; and
   posturing legs of the physical object.

4. The computerized method of claim 3, wherein the plurality of movements further comprises posturing a head of the physical object.

5. The computerized method of claim 1, wherein the plurality of constraints are selected from the group consisting of:
   a balance for the physical object;
   a location of a barrier;
   a sight line for the physical object;
   reachability of the target;
   physiological correctness; and
   a strength of the physical object.

6. The computerized method of claim 1, wherein the physical object is a human.

7. Logic encoded in media for predicting posture of a physical object, the logic operable to perform the following steps:
   store a plurality of posturing rules for a respective activity in a storage location;
   receive a start posture of a physical object for the activity;
   receive a location of a target for the activity;
   divide the activity into a plurality of movements based on the start posture and the location of the target; and
   determine, without using motion capture data, an end posture of the physical object for the activity by:
      positioning the physical object using an action specified by at least one of the posturing rules for each of the movements,
      checking a resulting state of the physical object against at least one of a plurality of constraints associated with each of the movements; and
      wherein the logic is further operable to adjust an intermediate posture of the physical object based on a result of the checking step.

8. The logic encoded in media of claim 7, the logic further operable to select one of a plurality of modules for the respective activity.

9. The logic encoded in media of claim 7, wherein the plurality of posturing rules comprises:
   horizontally positioning the physical object relative to the target;
   flexing a torso of the physical object;
   rotating a pelvis of the physical object around a vertical axis;
   vertically positioning the pelvis of the physical object; and
   posturing legs of the physical object.

10. The logic encoded in media of claim 9, wherein the plurality of movements further comprises posturing a head of the physical object.

11. The logic encoded in media of claim 7, wherein the plurality of constraints are selected from the group consisting of:
   a balance for the physical object;
   a location of a barrier;
   a sight line for the physical object;
   reachability of the target;
   physiological correctness; and
   a strength of the physical object.

12. The logic encoded in media of claim 7, wherein the physical object is a human.

13. A computerized method for predicting posture of a physical object, comprising:
   selecting one of a plurality of modules for a respective activity;
   storing a plurality of posturing rules for the respective activity in a storage location, the plurality of posturing rules comprising:
      horizontally positioning the physical object relative to the target;
      flexing a torso of the physical object;
      rotating a pelvis of the physical object around a vertical axis;
      vertically positioning the pelvis of the physical object; and
      posturing legs of the physical object;
   receiving a start posture of a physical object for the activity;
   receiving a location of a target for the activity;
   determining, without using motion capture data, an end posture of the physical object for the activity by:

positioning the physical object using an action specified by at least one of the posturing rules for each of the movements;

checking a resulting state of the physical object against at least one of a plurality of constraints associated with each of the movements; and adjusting an intermediate posture of the physical object based on a result of the checking step.

14. The computerized method of claim 13, wherein the plurality of constraints are selected from the group consisting of:

a balance for the physical object;
a location of a barrier;
a sight line for the physical object;
reachability of the target;
physiological correctness; and
a strength of the physical object.

15. The computerized method of claim 13, wherein the plurality of movements further comprises posturing a head of the physical object.

16. The computerized method of claim 13, wherein the physical object is a human.

* * * * *